United States Patent Office 2,847,456
Patented Aug. 12, 1958

2,847,456
ACYLALS

Charles D. Hurd, Evanston, Ill., assignor to Columbia-Southern Chemical Corporation, Pittsburgh, Pa., a corporation No Drawing. Application July 10, 1953
Serial No. 367,343

5 Claims. (Cl. 260—484)

This invention relates to the production of acylals by reaction of a mixed halomethyl ether of an alcohol containing at least one pair of carbon atoms in an aliphatic chain joined by a multiple bond with a salt of an organic carboxylic acid which is free from unsaturated aliphatic linkages, and to the novel compounds thereby produced.

The reaction of mixed halomethyl ethers with monocarboxylic salts may be exemplified as follows:

$$R'OCH_2X + RCOONa \rightarrow R'OCH_2OCOR + NaX$$

where R is hydrogen or an alkyl, substituted alkyl, aryl, or substituted aryl group having a maximum of about 12 carbon atoms and containing no aliphatic chains having double or triple bonds, R' is a monovalent radical having at least 3 and not more than about 12 carbon atoms and possessing aliphatic carbon-to-carbon unsaturation, that is, one or more pairs of carbon atoms in an aliphatic chain joined by a multiple bond, and X is a halogen. In a preferred embodiment of the invention, R' is an alkenyl group such as allyl, methallyl, crotyl, etc. In the broader aspects of the invention R' may represent other radicals containing aliphatic unsaturation, as for example the butadienyl radical, $$H_2C=CH-CH=CH-$$

and the 3-phenyl-2-butenyl radical, $C_6H_5CH=CHCH_2-$.

Typical of the monobasic acids whose salts may be used in the process of this invention are formic acid, acetic acid, propionic acid, and 2-acetoxypropionic acid. Salts of other monocarboxylic acids, such as 2-methoxyethanoic acid and dimethylaminoethanoic acid, may also be reacted.

The product of this invention in all examples is an ester of a carboxylic acid which is free from multiple bond carbon-to-carbon linkages in aliphatic chains, and an oxysubstituted methyl alcohol in which the substituent is a monovalent radical having aliphatic unsaturation and containing from 3 to about 12 carbon atoms. The alkenyl halomethyl ethers, and particularly allyl chloromethyl ether, have been found to be especially useful in the above syntheses.

The acylals prepared according to this invention may be polymerized or copolymerized with other substances, to form thermoplastic and thermosetting resins which find a variety of uses, such as molded plastic articles, paint vehicles, etc. They may also be copolymerized with other substances such as vinyl acetate, diallyl maleate, styrene, methyl methacrylate, diallyl phthalate, or the unsaturated alkyd resins produced by reaction of a dihydric alcohol (ethylene glycol or propylene glycol) with maleic or fumaric acid or with mixtures of maleic or fumaric acid and phthalic acid or anhydride.

The acylals in the monomeric form may be used in the preparation of other compounds. Hydrogen sulfide may be added to the double bond, for example, to form mercaptans, and ozone may be reacted with the double bond to produce aldehydes. Various other reagents may be reacted with acylals as will be evident to one of ordinary skill in the art.

While the acylals prepared according to this invention generally polymerize to form resins, not all have equal tendencies to polymerize. Allyloxymethyl formate, acetate, and 2-acetoxypropionate, show no polymerization after several months standing at room temperatures in the absence of an inhibitor, and polymerize only with the aid of a catalyst.

Specific embodiments of the present invention are given by way of illustration.

EXAMPLE I

Allyl chloromethyl ether was prepared by the reaction of allyl alcohol, paraformaldehyde, and hydrogen chloride. A 3-necked liter flask was fitted with a stirrer, calcium chloride drying tube, and gas inlet tube. Thirty-six grams of dry hydrogen chloride was passed into 116 grams of chilled allyl alcohol with stirring, and then 30 grams of paraformaldehyde was introduced while the contents of the flask were stirred gently. This addition was followed by another 36 grams of hydrogen chloride and finally an additional 30 grams of paraformaldehyde. The latter was not completely dissolved, and more hydrogen chloride was added to dissolve it. Two liquid phases formed and were separated. The other layer was dried 15 hours with calcium chloride. The crude yield was 164 grams, or 77 percent.

The crude product was distilled under diminished pressure to remove some of the allyl alcohol. The main fraction boiled at 106–107° C. at atmospheric pressure. This fraction was analyzed and found to contain 31.8 percent of chlorine compared to a calculated value of 33.3 percent of Cl for pure allyl chloromethyl ether, which suggested that allyl alcohol was the contaminant.

A 30 gram portion of the contaminated ether was refluxed for one hour with 15 grams of benzoyl chloride and 2 grams of diethylaniline, and then distilled.

Analysis of the product showed the following:

| | |
|---|---|
| Boiling point °C | 107–108 |
| Index of refraction $n^{23}D$ | 1.431 |
| Density $d^{23}{}_{20}$ | 1.025 |
| Percent Cl | 32.5 |

Other mixed halomethyl ethers useful as reagents in the present invention may also be prepared by the reaction of an unsaturated primary or secondary alcohol with formaldehyde and a halogen acid. For example, crotyl bromomethyl ether can be be prepared by reaction of crotyl alcohol with formaldehyde and hydrobromic acid. Ethers containing triple bond unsaturation, such as 2-butynyl chloromethyl ether, $$H_3CC \equiv CCH_2OCH_2Cl$$

may also be prepared. Allyl chloromethyl ether was used in the synthesis of acylals as shown by the illustrative examples given below:

EXAMPLE II

A 250 cc. 3-necked flask was equipped with a condenser, a mercury-sealed stirrer, and a dropping funnel which was protected with a calcium chloride drying tube. Eight and two-tenths grams (0.1 mole) of anhydrous sodium acetate was placed in the flask, and dry nitrogen was pumped through the system to displace air. Benzene was added to facilitate stirring, and 10.6 grams (0.1 mole) of allyl chloromethyl ether was dropped into the flask, which contents were stirred and cooled, during a half hour. A trace of hydroquinone was introduced as an inhibitor against polymerization. The mixture was then heated and refluxed with stirring for two hours, cooled, filtered from sodium salts, and fractionally distilled.

The properties of typical acylals produced according to this invention are shown in the table below:

Table I
PHYSICAL CONSTANTS AND ANALYSES

| Acylals | B. P., °C. | Mm. | $d^{23}{}_{20}$ | $n_D$ (°C.) | Calcd. | | Found | |
| --- | --- | --- | --- | --- | --- | --- | --- | --- |
| | | | | | C | H | C | H |
| Allyloxymethyl formate | 136–138<br>50.5–52.5 | Atm.<br>23 | 1.021 | 1.4170 (23) | 51.7 | 6.90 | 53.4 | 7.02 |
| Allyloxymethyl acetate | 145–146 | Atm. | 0.989 | 1.4154(23) | 55.4 | 7.70 | 55.9 | 7.49 |
| Allyloxymethyl 2-acetoxypropionate | 115–118 | 0.5 | | 1.4452(22) | 53.5 | 6.98 | 53.7 | 6.96 |

The product obtained had the properties set forth below:

Boiling point _____ °C__ 145–146
Density at 23° C. ($d^{23}{}_{20}$) _____ 0.989
Index of refraction at 23° C _____ 1.4154
Composition (observed):
  Carbon _____ percent__ 55.9
  Hydrogen _____ do____ 7.49

The probable formula of the compound is:

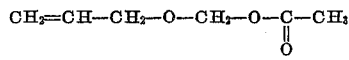

and the calculated quantities of carbon and hydrogen are 55.4 percent and 7.70 percent respectively.

EXAMPLE III

The procedure of Example I was followed except that 0.1 mole of sodium formate, was substituted for sodium acetate. This procedure gave 60–90 percent yields of all acylals. The properties of the compounds obtained are given in Table I below.

EXAMPLE IV

The procedure of Example I was followed except that 0.1 mole of sodium 2-acetoxypropionate was used in place of sodium acetate, and the crude product, after filtration from sodium salts, was scrubbed with an aqueous solution of sodium bicarbonate, dried, and then distilled.

Analysis of the distillate showed the following properties:

Boiling point _____ 115–118° C. at 0.5 mm.
Index of refraction _____ 1.4452 at 22° C.
Observed composition:
  Carbon_____ 53.7%.
  Hydrogen_____ 6.96%.

The probable formula of this compound is:

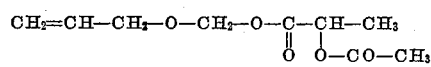

Deviations from the above procedures may be made. For instance, pyrogallol may be used instead of hydroquinone as polymerization inhibitor. Toluene may be used in place of benzene as the solvent, and it is not necessary to use any solvent at all. It is evident from the above examples that is is often desirable to make minor changes in procedure in the production of particular acylals, so that a high yield of substantially pure product will be obtained.

All the acylals except the formate were obtained as substantially pure products. The formate obtained was impure, apparently containing about 10 percent of allyl formal whose boiling point is substantially the same as that of the formate.

Various ethers other than allyl chloromethyl ether can be reacted with salts of organic monobasic carboxylic acids according to the present invention.

Methallyl chloromethyl ether may be reacted with sodium chloroacetate to form methallyloxymethyl chloroacetate as follows:

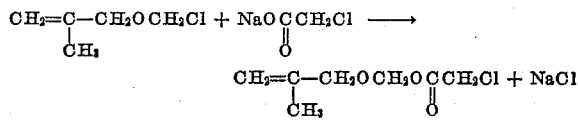

Mixed halomethyl ethers containing a substituted alkenyl radical or an alkynyl radical may also be reacted. Cinnamyl chloromethyl ether and 2-butynyloxymethyl chloride (2-butynyl chloromethyl ether) are examples of such compounds. In general any mixed halomethyl ether which has a radical having at least 3 and not more than about 12 carbon atoms and containing at least one pair of carbon atoms linked by a multiple bond in an aliphatic chain may be used as the ether reagent in the present invention.

Salts of carboxylic acids containing up to about 12 carbon atoms per molecule are useful as reagents. Heavier salts, particularly those of the fatty acids, generally form products whose polymers are less useful than polymers of the esters of lower molecular weight.

While specific embodiments of the invention have been described, these examples are illustrative and the scope of the invention is limited only by the appended claims.

I claim:
1. An alkenyloxymethyl ester of an aliphatically saturated monocarboxylic acid selected from the group consisting of formic, acetic and 2-acetoxypropionic, said alkenyl group having from 3 to 12 carbon atoms.
2. An allyloxymethyl ester of an aliphatically saturated monocarboxylic acid selected from the group consisting of formic, acetic and 2-acetoxypropionic acids.
3. Allyloxymethyl formate.
4. Allyloxymethyl acetate.
5. Allyloxymethyl 2-acetoxypropionate.

References Cited in the file of this patent

UNITED STATES PATENTS

| | | |
| --- | --- | --- |
| 2,410,551 | Rehberg et al. | Nov. 5, 1946 |
| 2,475,062 | Tawney | July 5, 1949 |
| 2,534,255 | Filachione et al. | Dec. 19, 1950 |

OTHER REFERENCES

Bauer et al.: Abst. of appl'n Ser. No. 773,922, published November 1, 1949, 628 O. G. 257.
Bauer et al.: Chem. Abs. 44, 10730 (1950).
Hurd et al.: J. Am Chem. Soc. 74 (1952), 5128–30.